May 27, 1958 W. DOBLE 2,836,441
SHAFT SEAL WITH TAKE-UP FOR WEAR
Filed Sept. 28, 1953 2 Sheets-Sheet 1
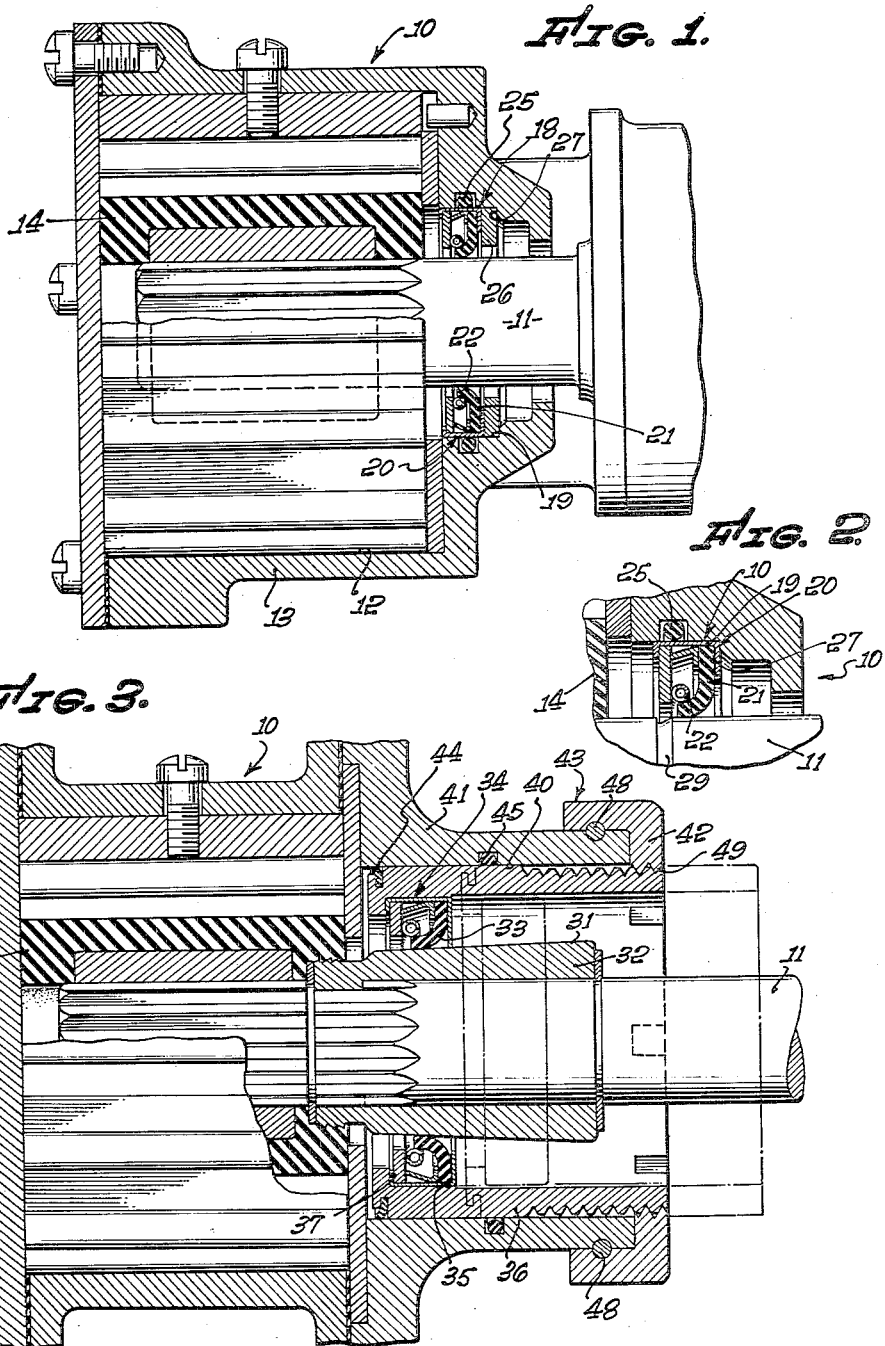
INVENTOR.
WARREN DOBLE,
By His Attorneys.
HARRIS, KIECH, FOSTER & HARRIS.

May 27, 1958 W. DOBLE 2,836,441
SHAFT SEAL WITH TAKE-UP FOR WEAR
Filed Sept. 28, 1953 2 Sheets-Sheet 2

INVENTOR.
WARREN DOBLE,
By His Attorneys.
HARRIS, KIECH, FOSTER & HARRIS

United States Patent Office 2,836,441
Patented May 27, 1958

2,836,441

SHAFT SEAL WITH TAKE-UP FOR WEAR

Warren Doble, North Hollywood, Calif., assignor, by mesne assignments, to Jabsco Pump Company, Burbank, Calif., a corporation of California Application September 28, 1953, Serial No. 382,715

2 Claims. (Cl. 286—11.16)

The present invention relates in general to shaft seals and a primary object thereof is to provide a shaft seal having means to compensate for wear of the seal and for wear of the shaft to prolong the useful life thereof.

While the shaft seal of the invention may be utilized in any desired installation, it finds particular utility in, and will therefore be considered in connection with, pumps for handling abrasive materials, such as pottery slips, which is a slurry of ground glass, clay, etc. However, it will be understood that such use of the shaft seal of the invention is illustrative only.

Considering the present invention more specifically, an important object thereof is to provide a mounting means for the seal and shaft which permits relative axial movement of the seal and the shaft. Thus, when the shaft becomes worn in the zone of engagement between the shaft and the seal, the seal and shaft may be shifted axially relative to each other to bring the seal into engagement with an unworn zone of the shaft, which is an important feature of the invention.

While wear of the seal itself may be compensated for in accordance with the present invention by substituting a new seal for the worn one whenever an unworn zone of the shaft is brought into operation, another important object of the invention is to provide a shaft seal wherein wear of the seal is automatically compensated for when the seal is shifted axially to bring it into engagement with an unworn zone of the shaft, thus obviating any necessity for replacing the seal as frequently.

More particularly, an important object of the invention is to provide the shaft with a conical surface, the seal being shifted to a zone of such conical surface of increased diameter each time an unworn zone of the conical surface is brought into operation, either by shifting the seal, or the conical shaft surface. With this construction, enlargement of the internal diameter of the seal due to wear is automatically compensated for each time an unworn zone of the conical surface of the shaft is brought into operation, which is an important feature.

Another object is to provide a shaft seal wherein the shaft surface engageable by the seal is provided by a replaceable collar or sleeve on the shaft, thereby avoiding wear of the shaft itself. An object in connection with certain embodiments of the invention is to make such sleeve movable axially of the shaft to bring the seal into engagement with an unworn zone of the sleeve.

Another object is to provide a mounting means for the seal which includes a mounting member having a guideway for the seal, an insert member being disposed between the seal and a stop on the mounting member to maintain the seal in engagement with one zone of the shaft. Subsequently, when it is desired to shift the seal to an unworn zone of the shaft, it is merely necessary to remove the insert member to permit the seal to shift into engagement with an unworn zone of the shaft. Preferably, the insert member is a washer and the stop on the mounting member is an annular shoulder thereon at one end of the guideway for the seal.

Another object is to provide a mounting means which includes a mounting structure and an actuator threadedly engaging the mounting structure and engaging the shaft seal, the seal being axially shiftable upon rotation of one of the components of the assembly by virtue of such threaded connection between the actuator and the mounting structure. With this mounting means, a plurality of zones of the shaft may be utilized, which is an important feature.

The foregoing objects, advantages and features of the present invention, together with various other objects, advantages and features thereof which will become apparent, may be attained with the exemplary embodiments of the invention illustrated in the accompanying drawings and described in detail hereinafter. Referring to the drawings:

Fig. 1 is a longitudinal sectional view of a pump incorporating one embodiment of the shaft seal of the invention;

Fig. 2 is a fragmentary sectional view on an enlarged scale which duplicates a portion of Fig. 1 of the drawings and which shows the seal shifted axially into engagement with an unworn zone of the shaft of the pump;

Fig. 3 is a longitudinal sectional view of a pump incorporating another embodiment of the shaft seal of the invention.

Figure 4:
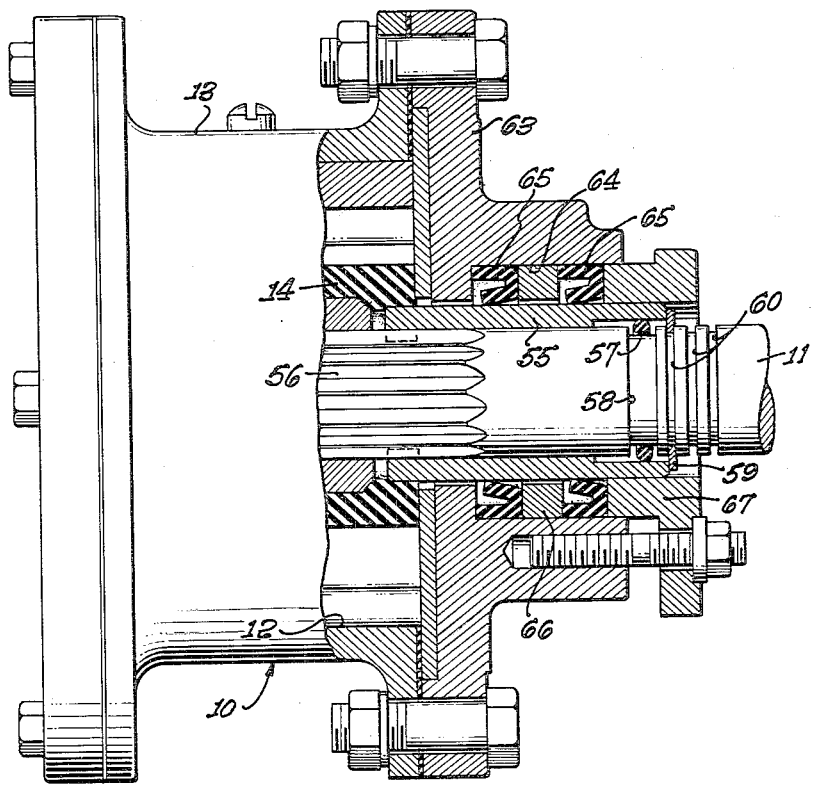
Fig. 4 is a longitudinal sectional view of a pump incorporating still another embodiment of the shaft seal of the invention.

Referring first to Fig. 1 of the drawings, illustrated therein is a pump 10 having a shaft 11 which extends into an impeller chamber 12 in a housing 13 of the pump, the shaft 11 having fixed thereon an impeller 14 which is of rubber or rubber-like material in the particular construction illustrated.

The housing 13 serves as a mounting member for a shaft seal indicated generally by the numeral 18, the shaft seal being disposed in a guideway 19 formed in the housing coaxially with the shaft. The shaft seal 18 per se is conventional and includes a retainer assembly 20 for a lip seal or seal element 21, the lip seal being biased into sealing engagement with the shaft by a garter spring 22. The retainer assembly 20 is axially shiftable in the guideway 19, being sealed relative to the housing 13 by an O-ring 25. The shaft seal 18 is normally maintained in the position shown in Fig. 1 of the drawings by an insert member, shown as a washer 26, disposed between the shaft seal and a stop, shown as an annular shoulder 27, on the housing 13 at one end of the guideway.

In operation, particularly where the pump 10 is handling abrasive materials, the shaft 11 will wear in the zone of engagement between the shaft and the lip seal 21, such wear producing a groove 29 in the shaft, as shown in Fig. 2 of the drawings. Also, some wear of the lip seal 21 itself may occur. When such wear becomes excessive so that the shaft seal 18 tends to leak, the washer 26 may be removed, as shown in Fig. 2 of the drawings, to permit axial shifting of the shaft seal 18 so as to bring the lip seal 21 into engagement with an unworn zone of the shaft. If appreciable wear of the lip seal 21 has occurred, it, or the entire shaft seal 18, may be replaced at the same time. However, this frequently is not necessary. Thus, it will be apparent that, by making the shaft seal 18 axially shiftable, the service life of the pump 10 is materially increased, which is an important feature. It will be understood that, instead of one washer 26, several washers may be used, such washers being removed one at a time to permit a plurality of zones of the shaft to be utilized.

Referring now to Fig. 3 of the drawings, illustrated therein is a pump which is generally similar to the pump of Fig. 1 of the drawings, identical reference numerals being applied. In Fig. 3 of the drawings, the shaft 11 is provided with a conical surface 31, such conical surface preferably being provided by a collar 32 which is replaceably fixed on the shaft 11 so that it may be removed and replaced by another similar collar when worn out. Engageable with the conical surface 31 is a lip seal or seal element 33 of a shaft seal 34 which is similar to the shaft seal 18, the shaft seal 34 being disposed in a bore 35 in an actuator 36 and being seated against an annular shoulder 37 at one end of the bore 35. The actuator 36 is axially slidable in a bore 40 in a mounting member 41 which, together with a rotatable adjusting member 42, form a mounting structure 43 for the actuator 36, the latter being sealed relative to the mounting member 41 by sealing elements 44 and 45.

The adjusting member 42 is keyed to the mounting member 41, which is suitably secured to the housing 13 of the pump 10, by pins 48 in such a way that the adjusting member 42 is rotatable relative to the mounting member 41, but is not movable axially thereof. A threaded connection 49 is provided between the adjusting member 42 and the actuator 36.

In operation, the lip seal 33 ultimately grooves the conical surface 31 to such an extent that the shaft seal 34 tends to leak. Also, some wear of the lip seal 33 itself, tending to enlarge the internal diameter of the lip seal, will occur. At this juncture, the operator merely rotates the adjusting member 42 sufficiently to shift the lip seal 33 toward the right, as viewed in Fig. 3 of the drawings, to bring the lip seal into engagement with an unworn zone of the conical surface 31. As this is done, the lip seal 33 is also brought into engagement with a zone of the conical surface which is of increased diameter, thereby automatically compensating for wear of the lip seal itself at the same time, which is an important feature. As will be apparent, the lip seal 33 may be brought into successive ones of a large number of possible operating positions on the conical surface 31, thereby greatly increasing the useful life of the shaft seal 34, which is an important feature of the invention.

As will be apparent, when the entire conical surface 31 is worn out, the collar 32 may be removed and a new one substituted therefor. Also, the lip seal 33 or the entire shaft seal 34, may be removed and replaced by another whenever necessary.

Referring now to Fig. 4 of the drawings, illustrated therein is a pump which is also generally similar to the pump of Fig. 1 of the drawings, identical reference numerals being applied. In Fig. 4 of the drawings, the shaft 11 is provided with a collar or sleeve 55 having at one end internal splines which are engageable with splines 56 on the shaft to prevent rotation of the sleeve relative to the shaft, but to permit axial movement of the sleeve relative to the shaft. The sleeve is recessed at one end to receive an O-ring 57 disposed in an annular groove 58 in the shaft, this O-ring preventing leakage between the shaft and the sleeve. As will be apparent, there is no wear of the O-ring 57 since there is no relative rotation between the shaft 11 and the sleeve 55.

The sleeve 55 is retained in any one of a plurality of axial positions on the shaft 11 by means of a snap ring 59 which may be disposed in any one of a plurality of annular grooves 60 in the shaft. Thus, the sleeve 55 may be shifted axially of the shaft 11 to bring unworn zones thereof into operation, as will be described in more detail hereinafter.

Secured to the housing 13 is a mounting or supporting member 63 for a sealing means, this mounting member having therein a recess 64 which receives two lip seals 65 separated by an annular spacer 66. A plug 67 inserted into the recess 64 retains the lip seals 65 and the spacer 66 therein, the plug 67 being suitably secured to the mounting member 63.

Considering the operation of the embodiment of Fig. 4 of the drawings, it will be apparent that when the lip seals 65 have worn the sleeve 55 excessively, it is merely necessary to shift the sleeve axially to a new position to bring unworn zones thereof into operation, the sleeve being held in any one of its possible positions by the snap ring 59. If desired, the sleeve 55 could be made conical to attain the advantages discussed in connection with the embodiment of Fig. 3 of the drawings, the operation being similar except that the sleeve is axially movable, instead of the sealing means.

While I have disclosed exemplary embodiments of the present invention herein for purposes of illustration, it will be understood that various changes, modifications and substitutions may be incorporated in such embodiments without departing from the spirit of the invention as defined by the claims which follow.

I claim as my invention:

1. In combination: a supporting member; a shaft extending into and rotatable relative to said supporting member; a sleeve on and slidable axially of said shaft; means for keying said sleeve to said shaft to transmit rotation of said shaft to said sleeve; adjustable means engaging said sleeve and engageable with said shaft in any one of a plurality of axially spaced positions for preventing movement of said sleeve axially of said shaft in any one of a plurality of axially spaced positions of said sleeve on said shaft; and a seal carried by said supporting member and encircling and engaging said sleeve.

2. In combination: a supporting member; a shaft extending into and rotatable relative to said supporting member; said shaft having a plurality of axially spaced annular grooves therein; means for keying said sleeve to said shaft to transmit rotation of said shaft to said sleeve; a snap ring engaging said sleeve and disposed in one of said plurality of axially spaced annular grooves in said shaft to prevent movement of said sleeve axially of said shaft in any one of a plurality of axially spaced positions; and a seal carried by said supporting member and encircling and engaging said sleeve, said seal engaging different annular zones of said sleeve when said snap ring is in different ones of said plurality of axially spaced annular grooves in said shaft.

References Cited in the file of this patent

UNITED STATES PATENTS

| 2,052,108 | Okner et al. | Aug. 25, 1936 |
| 2,306,417 | Wiessner | Dec. 29, 1942 |
| 2,649,316 | Beezley | Aug. 18, 1953 |

FOREIGN PATENTS

| 475,094 | Canada | July 10, 1951 |

UNITED STATES PATENT OFFICE
CERTIFICATE OF CORRECTION

Patent No. 2,836,441 May 27, 1958

Warren Doble

It is hereby certified that error appears in the printed specification of the above numbered patent requiring correction and that the said Letters Patent should read as corrected below.

Column 1, line 22, for "slips" read -- slip --; line 71, after "with" insert -- the stop on the mounting member and into engagement with --.

Signed and sealed this 22nd day of July 1958.

(SEAL)
Attest:

KARL H. AXLINE
Attesting Officer

ROBERT C. WATSON
Commissioner of Patents